Figure 1:
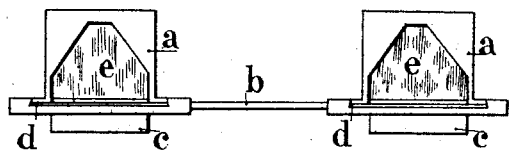

J. RICHARD.
STEREOSCOPIC CAMERA.
APPLICATION FILED FEB. 26, 1908.

1,013,815.

Patented Jan. 2, 1912.

WITNESSES
J. P. Davis
C. E. Holske

INVENTOR
Jules Richard
BY
Munn & Co
ATTORNEYS

UNITED STATES PATENT OFFICE.

JULES RICHARD, OF PARIS, FRANCE.

STEREOSCOPIC CAMERA.

1,013,815.   Specification of Letters Patent.   Patented Jan. 2, 1912.

Application filed February 26, 1908. Serial No. 417,900.

*To all whom it may concern:*

Be it known that I, JULES RICHARD, of 25 Rue Mélingue, in the city of Paris, Republic of France, engineer, have invented Improvements in Stereoscopic Cameras, of which the following is a full, clear, and exact description.

In stereoscopic cameras the two objectives form on the sensitive plate two images which, as is well known, are each reversed both in the vertical and in the lateral direction. If a negative plate of this kind be reversed in such manner that the upper part of the two images is properly viewed in the uppermost position, what then happens is that the image formed by the right-hand objective occupies the left-hand side of the plate, while that formed by the left-hand objective occupies the right-hand side. It is for this reason that it is actually necessary to transpose the two images of the negative in order to obtain the stereoscopic effect. This transposition of the negative is extremely inconvenient, necessitating a troublesome operation.

The present invention has for object to provide an optical device applicable to existing stereoscopic cameras for the purpose of avoiding the above-mentioned disadvantage. By the application of this optical device the images formed on the negative are rectified and not inverted in either sense, so that the positive can be obtained directly from the negative without any transposition of the images being necessary.

This device consists of two tetrahedra of special construction mounted opposite to the two objectives of the photographic apparatus and whose faces are so directed as to reverse the images in both senses, that is to say in the vertical and in the horizontal direction. Under these conditions since the objectives equally reverse the images in both directions, the negative obtained upon the plate is rectified both in the vertical and in the lateral direction, and the two images of the negative keep, under these conditions, their exact respective positions.

The present invention is particularly applicable to the case of stereoscopic color photography. In practice, when it is desired to take stereoscopic photographs in colors, a negative is taken and by chemical treatment, is transformed into a positive, but in consequence of the inversion of the two images upon the negative, it is necessary to cut the negative in halves, to interchange the two images and to mount the two halves of the negative upon a suitable support, such as a plate, frame or the like. This manner of operation necessitates not only considerable trouble, but also possesses the disadvantage of increasing the thickness of the negative in such manner that the latter can no longer be introduced into apparatus of the "taxiphote" class or the like. The present invention completely remedies this twofold disadvantage; in fact, since the negative obtained presents no inversion, it suffices to simply transform it into a positive by the ordinary chemical treatment without the necessity of any mechanical inversion of the images.

The annexed drawing illustrates, by way of example, one form of the present invention.

Figure 9:
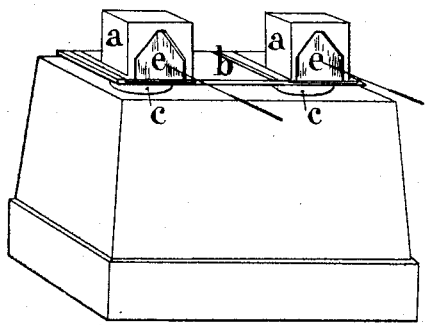

Figures 1 to 4 show the device respectively in front elevation, side elevation, and in plan, viewed from above and from beneath. Figs. 5 to 8 are detailed views showing one of the tetrahedra seen on each of its four sides. Fig. 9 shows the application of the present invention to a stereoscopic camera.

Figure 2:
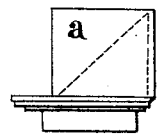
Figure 3:
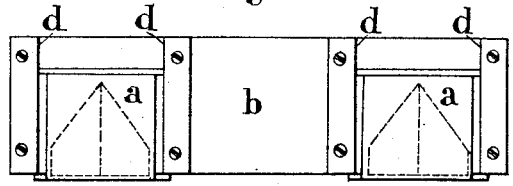
Figures 5, 6:
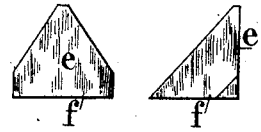
Figure 4:
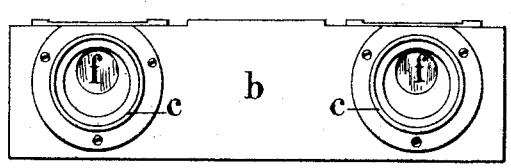
Figure 7:
Figure 8:

The device comprises two tetrahedra adapted to be mounted respectively opposite the two objectives of the photographic apparatus. Each tetrahedron is contained within an envelop or case $a$ open on the two sides corresponding to the entrance and exit of the light rays. These two envelops or casings $a$ are adjustably mounted upon a plate $b$ presenting two tubulures $c$ capable of adapting themselves to the two tubular casings containing the objectives of the apparatus. The two casings $a$ may, for example, slide in recesses $d$ in the plate $b$ as is shown in Figs. 1 to 3. This movability of the two casings $a$ permits of the regulation of the position of the luminous pencils emerging from the two tetrahedra with respect to the optical axes of the objectives. Each tetrahedron presents two mutually perpendicular faces $e$, $f$ and two other faces $g$, $h$ each inclined at an angle of 45° to the two preceding faces, as is shown in Figs. 5 to 8. The two tetrahedra are mounted in their envelops $a$ in such manner that the faces $f$ for example, are parallel to the objectives of the apparatus. The faces $e$ then constitute the entrance faces of the light rays.

The special disposition of the inclined faces $g$, $h$ has for effect to reflect the images while simultaneously reversing them, both in the vertical and in the lateral direction.

The instrument is mounted upon the stereoscopic camera, as shown in Fig. 9. In this case the apparatus must be held, in making an exposure, in a position perpendicular to the directions of the object to be photographed. The light rays coming from this object enter the faces $e$ of the two tetrahedra, are thereupon reflected from the inclined faces $g$, $h$, emerge through the faces $f$ and finally pass through the objectives of the camera. As above mentioned, the images reflected from the inclined faces $g$, $h$ are initially reversed in the vertical and also the lateral direction; then they are again reversed in both directions by the objectives. The negative thus obtained, viewed in the stereoscope, will thus give the stereoscopic effect on the condition that the glass face of the slide is turned toward that side on which are situated the eye-pieces of the stereoscope. This negative thus presenting no inversion, permits of the positive being directly obtained. In the case of color photography, it will be transformed into a positive by the well-known chemical treatment. In the case of ordinary photography positives are directly obtained in a single operation from this negative without the necessity of inverting the two images.

By the application of the present device the light-rays are rotated into a perpendicular direction, and the camera must therefore be held in a direction perpendicular to the direction of the photographic object, but if one wishes to keep the camera in its ordinary position it will be sufficient to place opposite to the entrance faces $e$ of the tetrahedra, either a mirror inclined at 45° to these faces, or, preferably a totally reflecting prism.

The apparatus of the present invention may be of any appropriate dimensions suitable for application to stereoscopic cameras, and the method of mounting the tetrahedra may vary according to its application.

Claims:

1. In an optical device for obtaining non-reversed negatives in stereoscopic cameras, the combination with the two objectives of the stereoscopic camera, of two tetrahedra, each tetrahedron presenting two faces perpendicular the one with the other, and two other faces each inclined at an angle of 45° to the two first mentioned faces, and means whereby the said tetrahedra are adapted to be arranged in front of the two objectives of the camera, so that one of the two faces perdicular to each other of each of said tetrahedra is perpendicular to the optical axis of the corresponding objective, and the other face constitutes the entrance face of the luminous rays.

2. An instrument for obtaining non-reversed negatives in stereoscopic cameras, the said instrument comprising two tetrahedra each presenting two faces perpendicular the one with the other, and two other faces each inclined at an angle of 45° to the two first mentioned faces, a plate having two tubulures adapted for engagement with the tubular casings containing the objectives of the camera, and casings on said plate in which the said tetrahedra are mounted.

3. An instrument for obtaining non-reversed negatives in stereoscopic cameras, the said instrument comprising a plate adapted to be mounted upon a stereoscopic camera, and having two tubulures adapted for engagement with the two tubular casings containing the objectives of the camera, the said plate being provided with recesses, two casings mounted to slide in said recesses, the said casings being open on the sides corresponding to the entrance and exit of the light rays, and a tetrahedron mounted in each of said casings, each tetrahedron presenting two faces perpendicular the one with the other and two other faces each inclined at an angle of 45° to the two first mentioned faces.

4. The combination with a stereoscopic camera having two tubular casings containing objectives both of same focal length, of a plate having tubulures adapted to engage the tubular casings containing the said objectives, casings adjustable on said plate and open on the two sides corresponding to the entrance and exit of the light rays, and a tetrahedron contained in each of said adjustable casings, and arranged in front of the corresponding objectives, each of said tetrahedral presenting two faces perpendicular the one with the other, and two other faces each inclined at an angle of 45° to the two first mentioned faces, each tetrahedron being so mounted in its casing that the two faces perpendicular to each other constitute respectively the entrance and exit faces of the light rays, the said inclined faces of the tetrahedra reflecting the images and reversing them in both the vertical and the lateral direction, and the objectives of the camera again reversing them in both directions.

The foregoing specification of my improvements in stereoscopic cameras signed by me this 10th day of February 1908.

JULES RICHARD.

Witnesses:
 H. C. COXE,
 MAURICE H. PIGNET.

Copies of this patent may be obtained for five cents each, by addressing the "Commissioner of Patents, Washington, D. C."